(No Model.)
C. ROHRBACH.
NUT LOCK.
No. 559,464. Patented May 5, 1896.
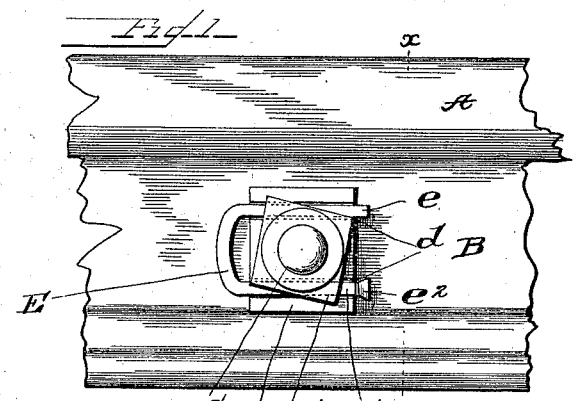
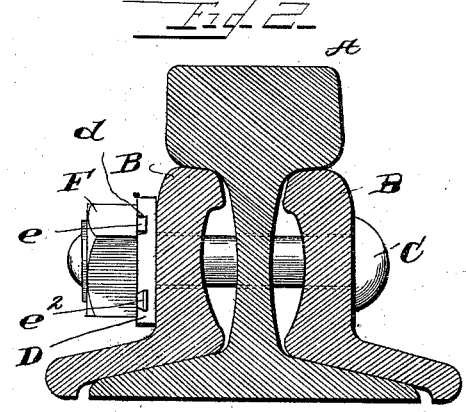
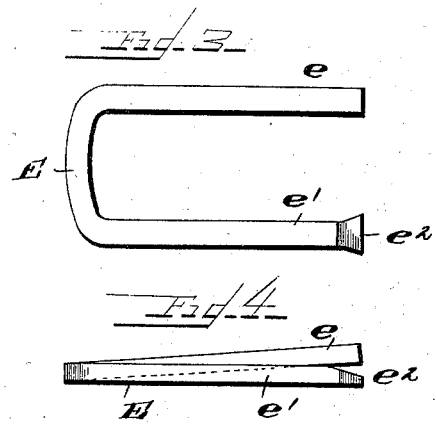
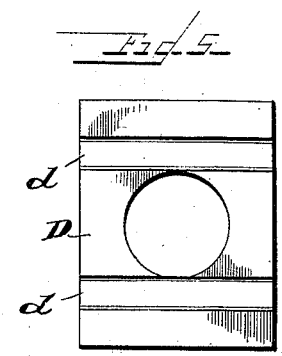
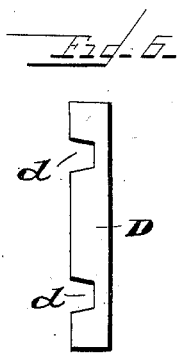
Witnesses
G. A. Taubenschmidt
C. F. Funk
Inventor
Charles Rohrbach
By Edwin S. Clarkson
Attorney United States Patent Office.

CHARLES ROHRBACH, OF CHESTER, PENNSYLVANIA.

NUT-LOCK.

SPECIFICATION forming part of Letters Patent No. 559,464, dated May 5, 1896.

Application filed October 16, 1894. Serial No. 526,077. (No model.)

*To all whom it may concern:*

Be it known that I, CHARLES ROHRBACH, a citizen of the United States, residing at Chester, in the county of Delaware and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut-locks in which a spring member is employed to insure the tension of bolts used in securing articles or structures, and has for its object to compensate for the slack resulting from wear of the nut or bolt head and contiguous surfaces or by the unscrewing or displacing of the nut.

The invention consists in the peculiar construction of the washer and a spring member interposed between the washer and the nut.

In the drawings, Figure 1 is a side elevation of a railroad-rail with fish-plate and my invention applied. Fig. 2 is a section on the line X X, Fig. 1. Fig. 3 is a top plan view of the spring member detached. Fig. 4 is a side elevation of the same. Fig. 5 is a top plan view of the washer, and Fig. 6 is a side elevation of the same.

A represents a suitable rail, B a fish-plate, and C a bolt.

D is a washer having a central aperture through which the bolt passes. On each side of this aperture are grooves $d$, the sides of which slope outwardly from the bottom to the top of the washer. These grooves, when the washer is in proper position, are in a horizontal plane.

E is the spring member of my improved lock, which is substantially U-shaped, and composed of highly-tempered spring-steel. The arm $e$ of the member E is bent upward, so that its normal position is in a higher plane than that of the arm $e'$. The end of the arm $e'$ is flattened out and "drawn" to an edge, as at $e^2$, thereby forming a head or enlargement. The arms of the spring members are of such thickness that they fit snugly into the grooves $d$ in the washer, and the head or enlargement $e^2$ prevents the said members from sliding out from under the nut F.

The bolt being in place in the rail and fish-plate, the washer is slipped over the bolt with the grooves in a horizontal plane, the spring member is placed in the grooves $d$ and the nut F screwed down upon the washer. In screwing the nut on it first engages the elevated arm $e$ of the spring member, and as it is screwed in place it forces the arm $e$ back into its groove $d$ in the washer.

The tendency of the arm $e$ to spring upward against the bottom of the nut will, in a measure, bind the threads in the nut against the threads of the bolt and thereby hold the nut firmly and prevent it from turning and becoming accidentally loosened. The binding of threads caused by the arm $e$ will not be great enough to injure them.

What I claim, and desire to secure by Letters Patent, is—

In a nut-lock, the combination of a washer having horizontally-disposed flaring grooves, a lock consisting of a U-shaped piece of spring metal, one arm of which is normally in a higher plane than the other and adapted to be forced into the same plane, a head formed on the end of the other arm, as described.

In testimony whereof I affix my signature in presence of two witnesses.

CHARLES ROHRBACH.

Witnesses:
 FRED HOWARD,
 JOHN LONG.